United States Patent [19]

Post

[11] Patent Number: 5,722,326
[45] Date of Patent: Mar. 3, 1998

[54] MAGNETIC LEVITATION SYSTEM FOR MOVING OBJECTS

[75] Inventor: Richard F. Post, Walnut Creek, Calif.

[73] Assignee: The Regents of the University of California, Oakland, Calif.

[21] Appl. No.: 295,577

[22] Filed: Aug. 1, 1994

[51] Int. Cl.⁶ ................................................. B60L 13/00
[52] U.S. Cl. ............................................................ 104/281
[58] Field of Search ............................ 104/281, 282, 104/283, 284, 286; 310/90.5, 12

[56] References Cited

U.S. PATENT DOCUMENTS

| | | | |
|---|---|---|---|
| 3,664,268 | 5/1972 | Lucas et al. | 104/281 |
| 3,768,417 | 10/1973 | Thornton et al. | 104/281 |
| 3,834,317 | 9/1974 | Miericke | 104/281 |
| 5,085,149 | 2/1992 | Huson | 104/281 |
| 5,163,546 | 11/1992 | Kawada et al. | 104/282 |
| 5,222,436 | 6/1993 | Coffey | 104/281 |
| 5,222,437 | 6/1993 | Shibata et al. | 104/282 |
| 5,253,592 | 10/1993 | Coffey | 104/281 |
| 5,270,593 | 12/1993 | Levi et al. | 310/12 |

*Primary Examiner*—Mark T. Le
*Attorney, Agent, or Firm*—Henry P. Sartorio; John P. Wooldridge

[57] ABSTRACT

Repelling magnetic forces are produced by the interaction of a flux-concentrated magnetic field (produced by permanent magnets or electromagnets) with an inductively loaded closed electric circuit. When one such element moves with respect to the other, a current is induced in the circuit. This current then interacts back on the field to produce a repelling force. These repelling magnetic forces are applied to magnetically levitate a moving object such as a train car. The power required to levitate a train of such cars is drawn from the motional energy of the train itself, and typically represents only a percent or two of the several megawatts of power required to overcome aerodynamic drag at high speeds.

5 Claims, 7 Drawing Sheets

To external drive power source

MAGNETIC LEVITATION SYSTEM FOR MOVING OBJECTS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to magnetic levitation, and more specifically, to magnetic levitation systems for moving objects.

2. Description of Related Art

In present maglev trains, superconducting magnet coils are used to produce the levitation force, and complicated control circuits are used to maintain the height of the train above the stationary track against which the levitation forces are produced. Since the trains are to operate at top speeds of order 500 kilometers per hour, this circuitry must be highly reliable, and must operate with high precision and with a short time response. In the present invention, neither superconducting coils nor primary control systems are required to maintain the separation between the guide rails and the magnetic elements on the train.

SUMMARY OF THE INVENTION

It is an object of the present invention to provide a simple, reliable and less expensive means for the magnetic levitation of high-speed objects such as trains.

Repelling magnetic forces are produced by the interaction of a flux-concentrated magnetic field (produced by permanent magnets or electromagnets) with an inductively loaded closed electric circuit. When one such element moves with respect to the other a current is induced in the circuit. This current then interacts back on the field to produce a repelling force. These repelling magnetic forces are applied to levitate a high-speed object such as a train. The power required to levitate a train is drawn from the motional energy of the train itself, and represents only a few percent of the several megawatts of power required to overcome aerodynamic drag at high speeds.

DETAILED DESCRIPTION OF THE INVENTION

Figure 1:
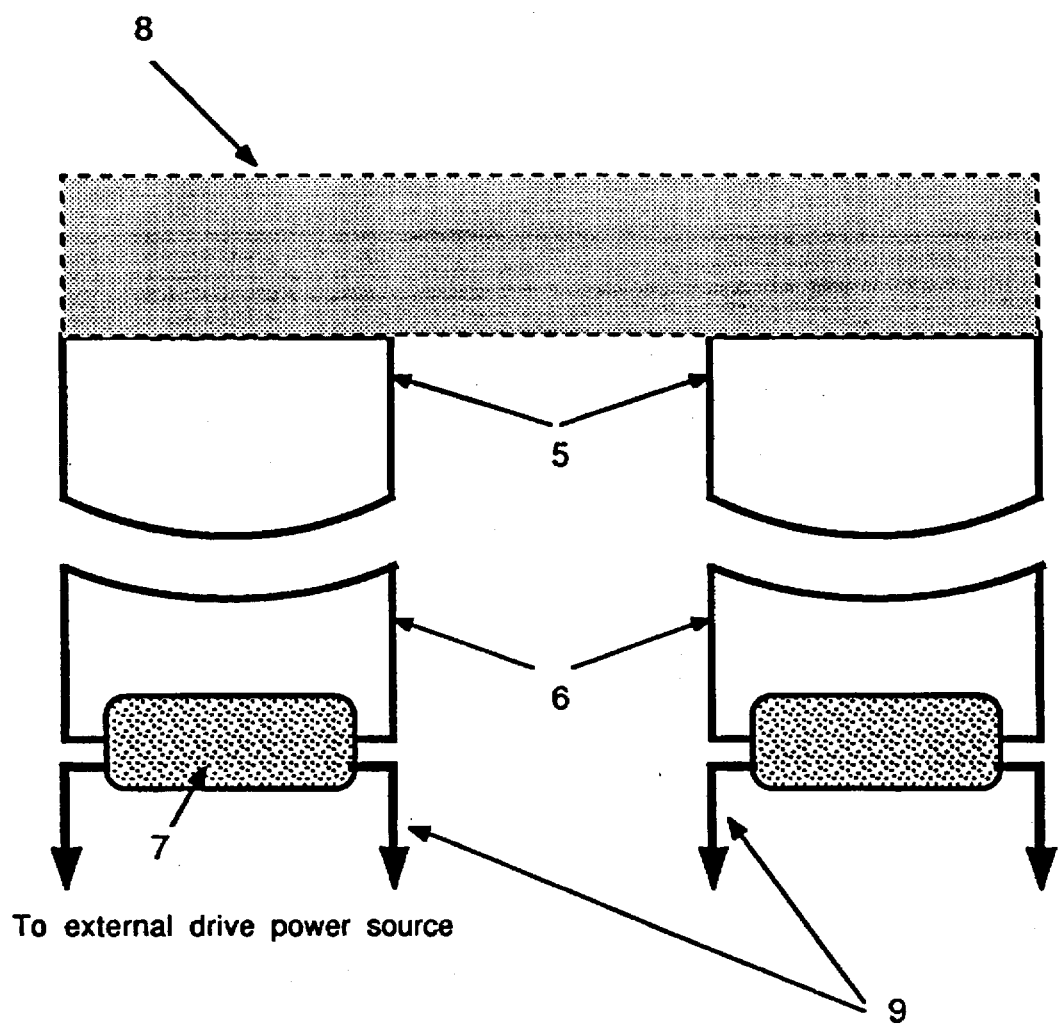
FIG. 1 is a schematic representation of an embodiment of the levitating system of the invention.

FIG. 1 is a schematic representation of an embodiment of the levitating system of the invention. It shows an end view of the pole arrays 5, mounted on the bottom of object 8 to be levitated, in close proximity to the inductively loaded circuits 6. These circuits carry on their lower sections the ferromagnetic collars 7, that provide inductive loading. Also shown schematically linking the circuits through the ferromagnetic collars 7, are the drive conductors 9, that can be sequentially pulsed to provide drive power to the levitated system comprising pole arrays 5 and object 8. In this embodiment the concavity of the upper portion of the circuits 6, when matched to the convexity of the pole assemblies 5, provides a centering force to overcome centrifugal and other de-centering influences in operation. The pole assemblies are excited either by permanent magnets or by electrical currents. Those pole assemblies that contain windings could be used to modify the levitation force in response to load changes, for example. The pole assemblies are attached to the train and the induction cells are stationary. The induction cells can comprise a closed induction circuit. On the order of 20 such magnet pole assemblies are on such a car (10 on a side), with each pole gap overlapping closely spaced induction cells in the track. The poles are mounted convexly transversely, while the induction cells have a matching concavity. This design thus provides an automatic centering action as the car traverses a curved section of track.

The induction cells lying along the track have the primary function of providing levitating forces as the magnet pole assemblies move over them. However, since these cells are constructed with a portion of their closed circuit covered by high-permeability ferrite (or laminated transformer iron), these same circuits could be used to transmit the driving force to the train. As a pole assembly passes over the induction cell there is a period of time when the magnetic field of the pole pair has a component lying perpendicular to the direction of motion of the train. If at this time a pulse of additional current is introduced in the induction circuit (by means of other turns of wire threading the high-permeability core), then a forward impulse can be given to the train. Since the totality of these forward impulses required to overcome aerodynamic drag need only produce a force that is at least an order of magnitude smaller than the levitation force, the magnetic fields produced by the pole assemblies should be adequate for the purpose. However, if there are reasons not to require this dual-use of the induction cells, the conventional means, i.e., a linear induction motor, could be used alongside the levitation system to drive the train.

The train parameters for one embodiment are:

Levitated weight: 50,000 kilograms.

Drag force at 500 kilometers per hour: 60,000 Newtons.

Length of train: 33 meters.

These parameters lead to a motive power requirement (at 500 km/h) of 8.3 megawatts.

The guide rails of a maglev train comprise a linear array of inductively loaded circuits. These circuits are excited by an array of pole-faces on the moving levitated object. The magnetic field from this array is approximated by the equations:

$$B_x = B_0 \sin(kx)\exp(-ky),$$
$$B_y = -B_0 \cos(kx)\exp(-ky) \qquad [1]$$

where $$k = \frac{2\pi}{\lambda}$$

and $\lambda$ is the length of one period of the array (typically four pole faces), x is the horizontal position and y is a displacement in the direction perpendicular to the face of the array.

By comparing the above approximation with the field calculated for an actual array excited by permanent magnets it is found that the field can be fitted within a few percent by choosing $B_0$ appropriately. As averaged over a single traverse of the pole face, the calculated force between the pole face and one circuit is given to a close approximation by equation [2]:

$$F = \frac{\lambda}{4\pi} \left[ \frac{(B_0 w)^2}{L_0} \right] \exp(-2ky) \text{ Newtons/circuit} \quad [2]$$

where w is the width of the circuit in meters, and $L_0$ is the inductance (in henrys) of one of the circuits.

The starting point for the derivation of equation [2] was to derive the current induced in a circuit through which a time-varying flux $\phi_0$ is passed, when the time variation of that flux is defined by a repetitive sine-wave pulse, $\sin(\omega t)$. The angular frequency $\omega$, is determined by the translational speed of the magnet array. In the limit where $\omega >> R/L_0$ (which will typically be the case at all but very low speeds), where R (ohms) is the resistance of a circuit, and $L_0$ (henrys) is the inductance of that circuit, then the relationship between the time-averaged force per circuit and the circuit parameters (equation [2]) takes the form given by equation [3]:

$$F = \frac{1}{2} \left[ \frac{B_0 \phi_0 w}{L_0} \right] \text{ Newtons.} \quad [3]$$

The force is therefore independent of frequency, as long as the earlier-stated inequality is satisfied.

Equation [3] was derived by calculating the time-averaged current flowing in a circuit. This current (in the limit defined above) is given by equation [4]:

$$I(t) = \left[ \frac{\phi_0}{L_0} \right] \sin(\omega t) \text{ Amperes} \quad [4]$$

From this equation, inserting the equations defining the flux and the inductance of the circuit, the time averaged power (during a current pulse) can be calculated. The result is given in equation [5].

$$P = RI^2 \text{ Watts} \quad [5]$$

Here, R is the resistance of a circuit and $I^2$ is the time averaged value of the current given by equation [4]. The resistance can be calculated from the resistance per unit length, $R_0$ (ohms), of the conductor and the perimeter of the circuit. R can be calculated from equation [6].

$$R = R_0[2w + 2(x_1 - x_0)] \text{ ohms,} \quad [6]$$

where $x_1 - x_0$ is the length of the conductors connecting the front and the rear legs of the inductive circuit.

Combining equations [2] and [5] yields an approximate expression for the force per Watt as shown in equation [7].

$$\frac{\text{Force}}{\text{Power loss}} = \frac{2\pi}{\lambda} \left[ \frac{L_0}{R} \right] \text{ N/Watt,} \quad [7]$$

The result is a ratio of lift-to-drag forces that improves with speed as shown in equation [8].

$$\frac{\text{Lift}}{\text{Drag}} = \left[ \frac{\omega L_0}{R} \right]. \quad [8]$$

where $\omega = 2\pi v_0/\lambda$ where $v_0$ in $\sec^{-1}$ is the velocity of the moving object.

It is assumed that at all speeds of interest the effective frequency $\omega$ (rad./sec.), of the traversal of a pole face over a circuit is such that $\omega >> R/L_0$, where R is the resistance of an induction circuit and $L_0$ is its inductance. Of course, as the speed of a slowing train approaches zero there will come a point (at very low speeds) when the levitating force will slowly decrease, so that the train lowers itself onto a set of auxiliary wheels that will sustain it until it regains speed. This action represents a graceful "fail-safe" mode for the system that would be valuable in case of failure of the drive-power system while the train was en route between stations.

Figure 2:
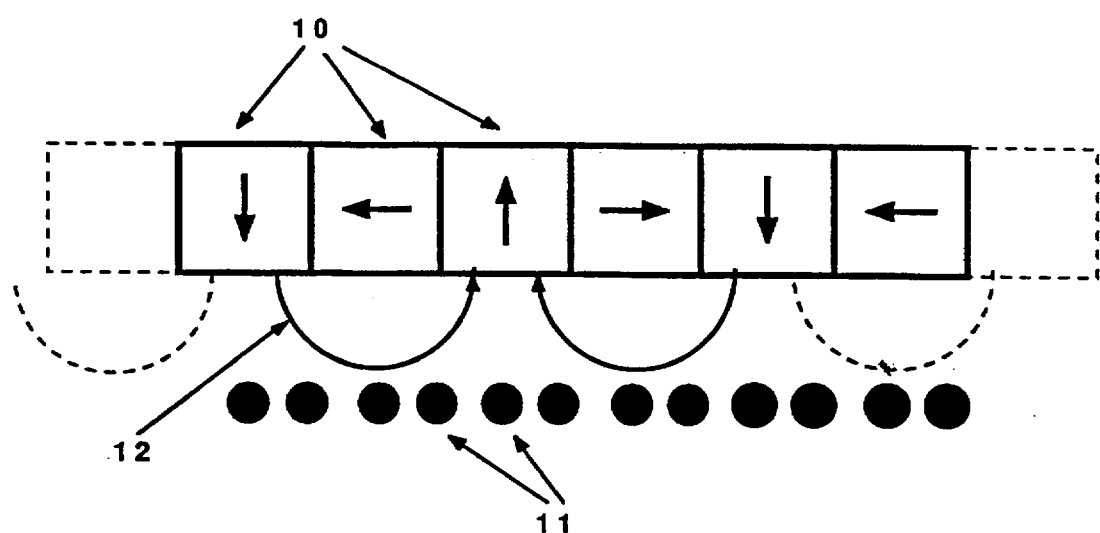
FIG. 2 depicts a pole-magnet array.

FIG. 2 depicts schematically a pole-magnet array 10, showing an end view of an array of permanent magnets with their directions of magnetization as shown. Field line 12, is typical of the pattern of field lines generated by this array. When this array moves horizontally it will induce currents in the circuits in the stationary track. Shown schematically is a sectioned end view of the conductors 11, that comprise the upper horizontal legs of closed circuits, the lower horizontal legs of which (not shown) are loaded with ferromagnetic material to increase the inductance of each circuit in accordance with the teachings of the invention.

Figure 3:
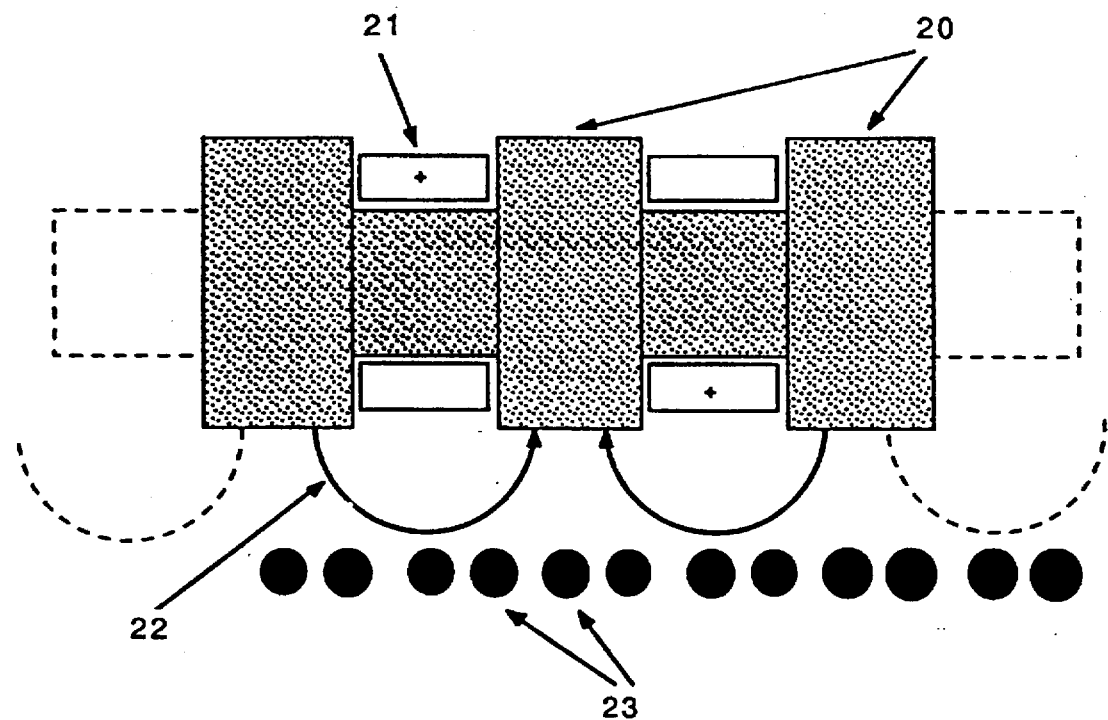
FIG. 3 is a pole array made of electromagnets.

FIG. 3 is a schematic of an embodiment in which the pole array is made up of electromagnets. In the drawing are shown soft-iron pole pieces 20, energized by magnet coils 21. A typical field line 22, is shown below the pole faces. In close proximity are the conductors 23, the upper elements of the inductive circuits which are shown in section (the rest of the circuits are not shown).

Figure 4:
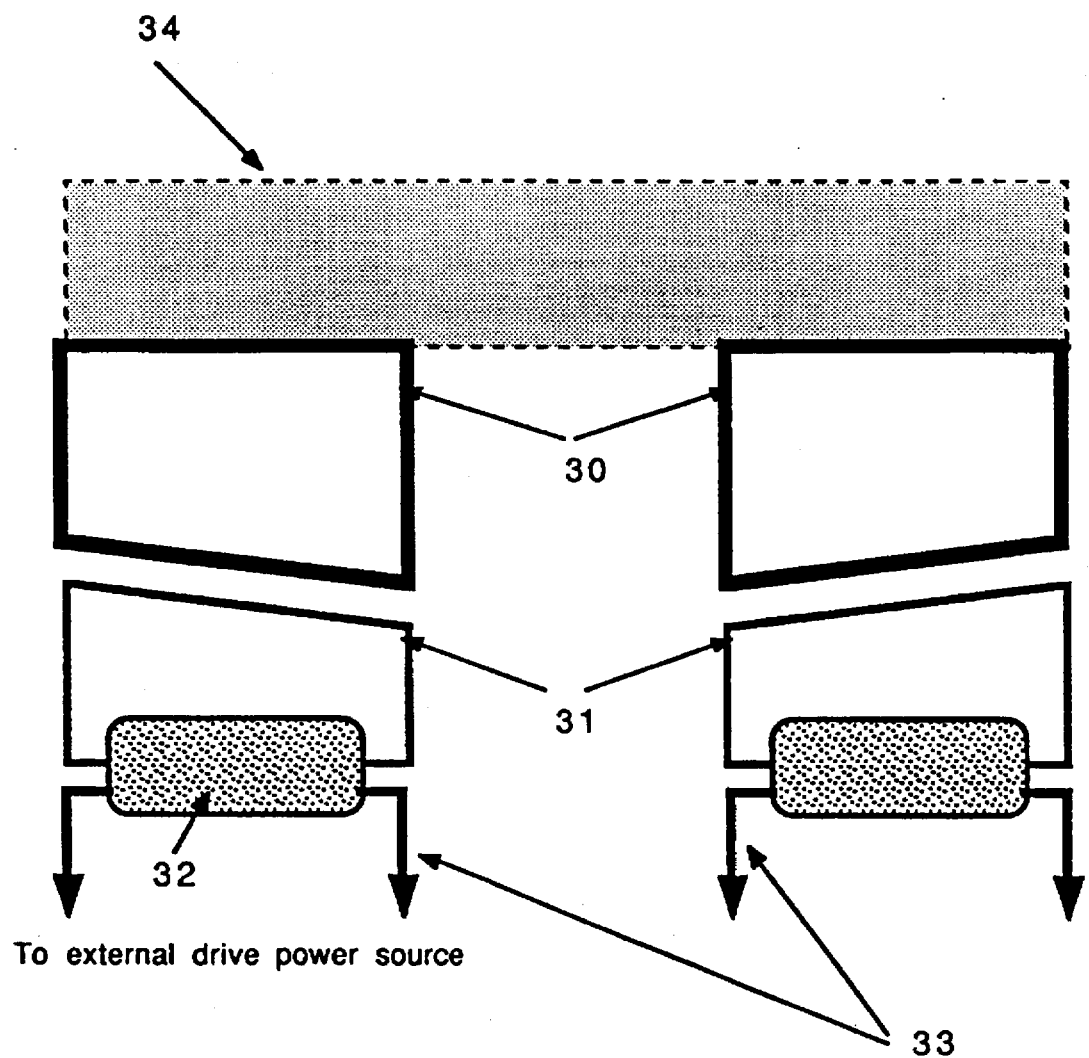
FIG. 4 is a schematic of a levitated system.

FIG. 4 is a schematic of an alternative embodiment of a levitated system. In this embodiment centering forces are provided by constructing the pole arrays 30, with a tilted lower face. This tilt matches that of the inductive circuits 31, so that sidewise forces are countered as in the embodiment shown in FIG. 1. Also shown are the ferromagnetic collars 32, the drive circuits 33, and a portion of the levitated body 34.

Figure 5:
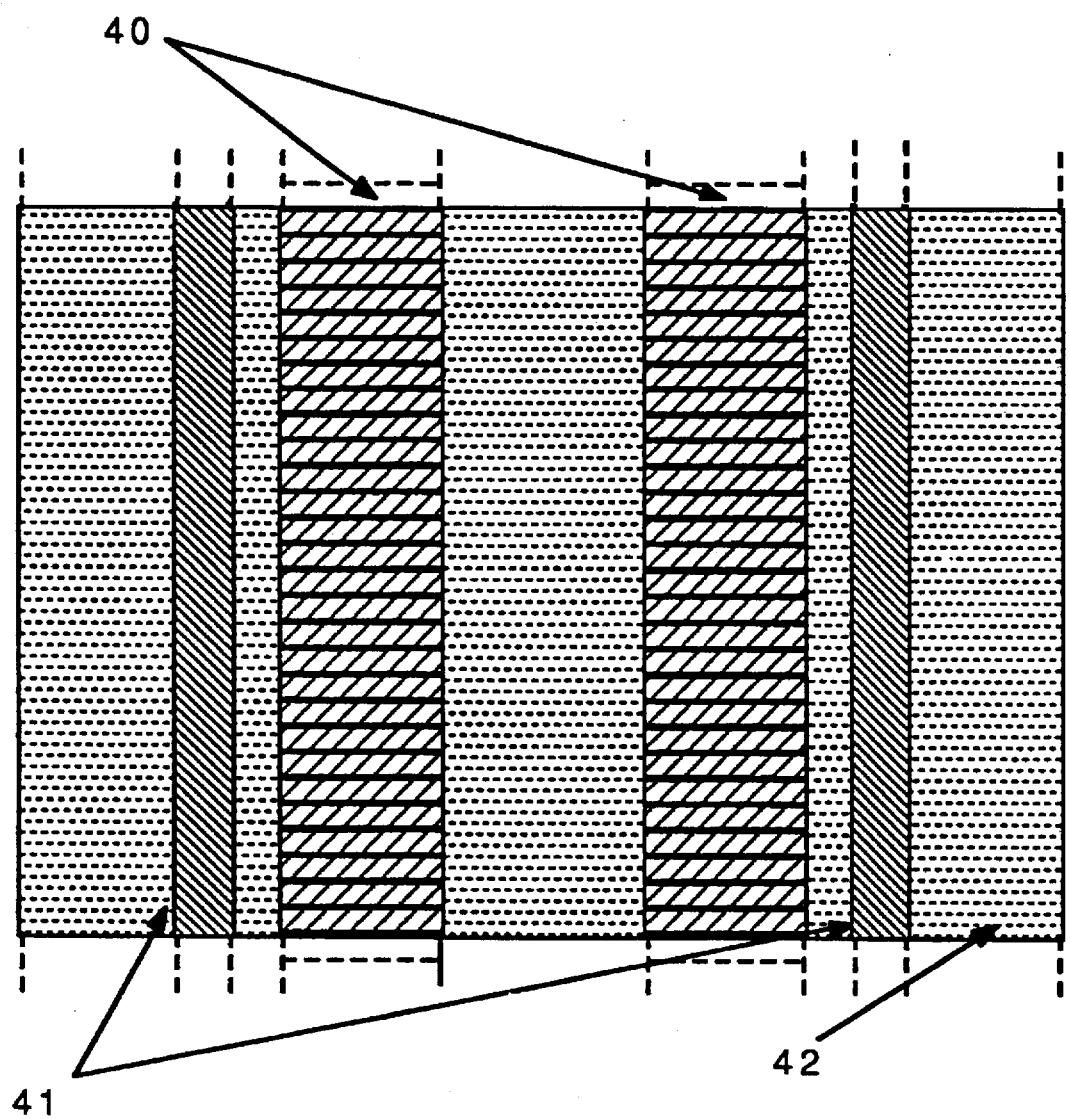
FIG. 5 depicts a section of track
Figure 6:
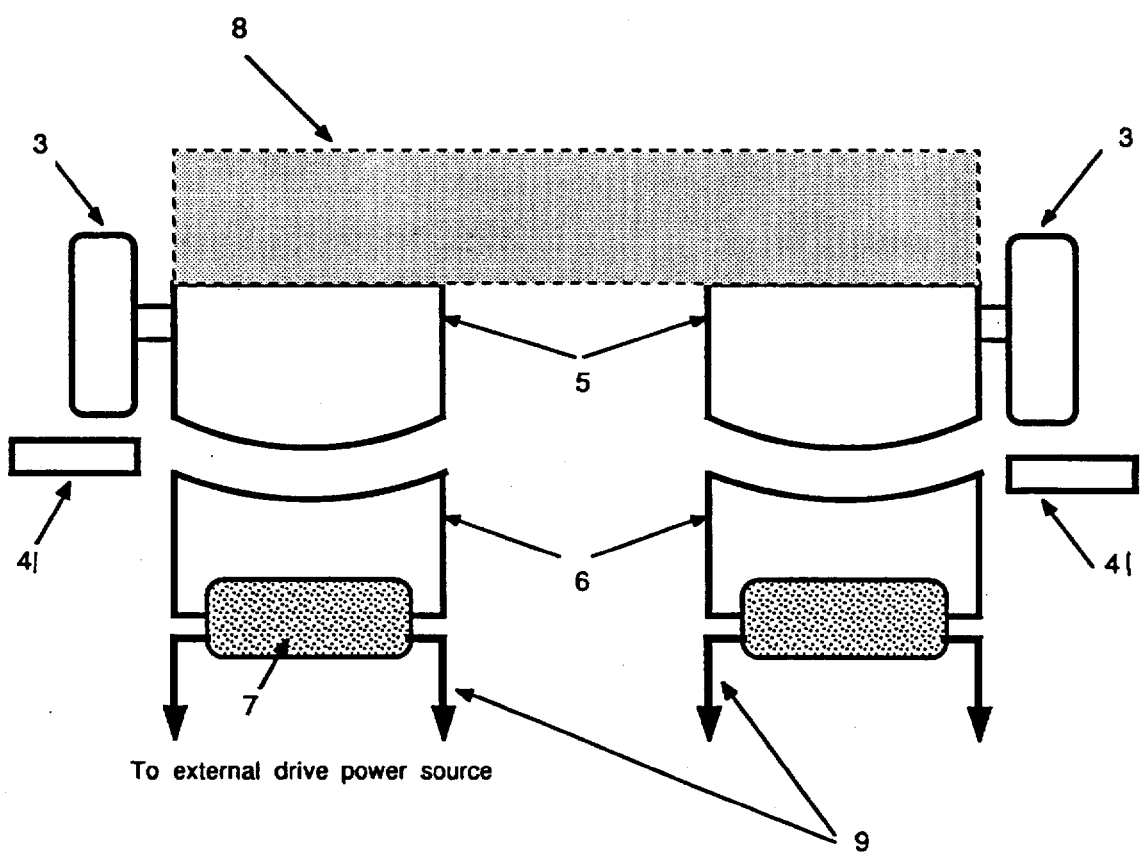
FIG. 6 shows runways for the touchdown wheels of the levitated car.

FIG. 5 depicts a section of track having upper conductor sections 40 of the inductively loaded circuits. Runways 41 are provided for the touchdown wheels 3 (FIG. 6) of the levitated car. Track bed 42 (FIG. 5) supports the inductively loaded circuits and the runways.

Figure 7:
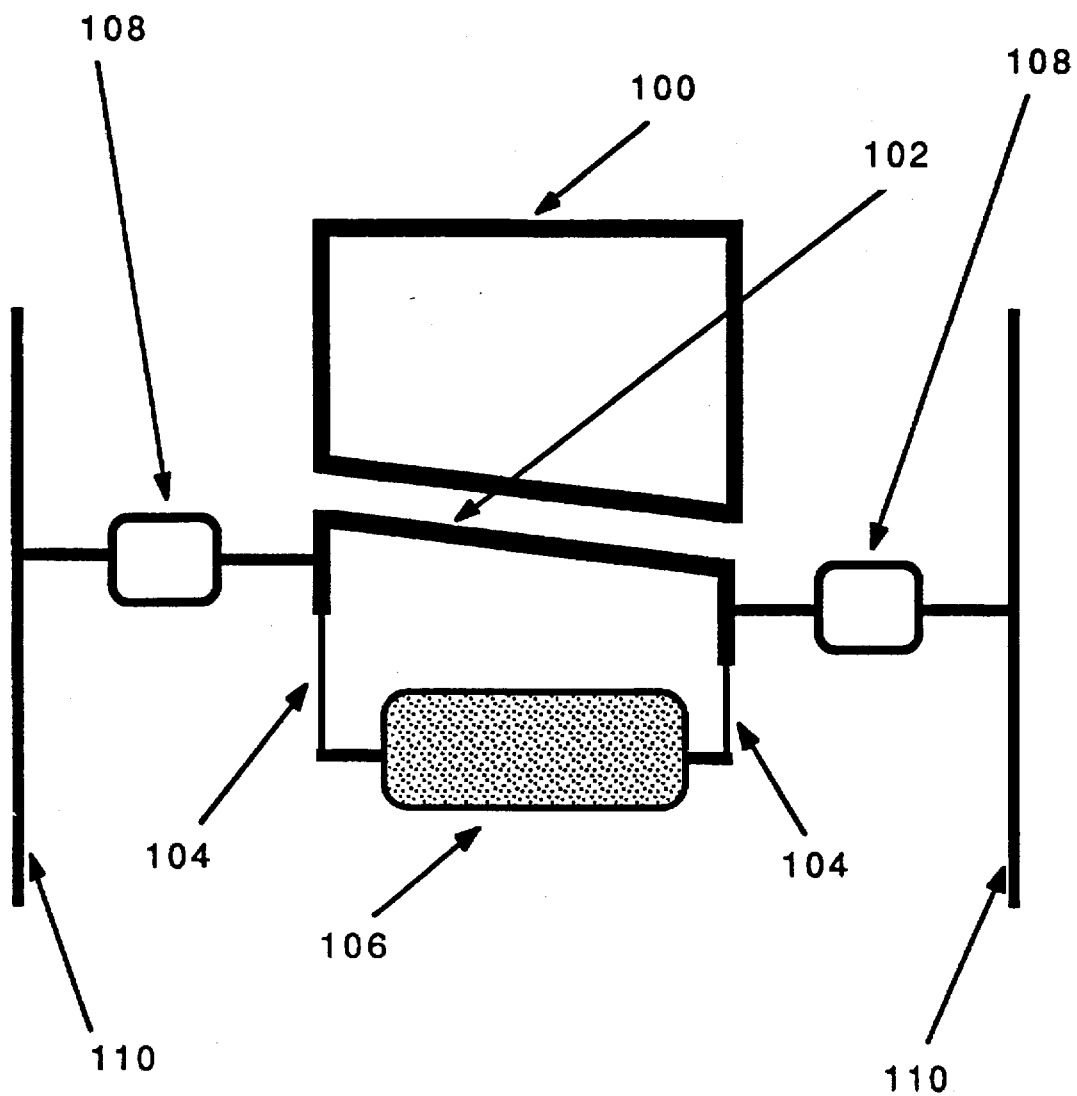
FIG. 7 depicts dissipative/compliant dampers to increase the lateral stability of a levitated moving system.

FIG. 7 depicts schematically the use of dissipative/compliant dampers to increase the lateral stability of a levitated moving system. It shows a portion of one side of a system such as shown in FIG. 4, including an end-on view of a pole assembly 100, located above a typical stationary conductor 102, in the track. Conductor 102 is coupled electrically, through flexible leads 104, to the lower circuit element passing through a ferromagnetic collar 106. Conductor 102 is supported through a support to dampers 108, which are supported by structures 110. Dampers 108 may utilize visco-elastic materials, as in commercial vibration dampers, or may include conventional hydraulic shock-absorbers, for example. When lateral oscillations of the supported moving object occur, a sideways force will be exerted on conductor 102, owing to its tilt (or concavity) relative to the pole assembly 100. This force will then be transmitted to dampers 108, which will act to suppress the oscillations.

Consistent with the maglev train parameters given above, the following values for the magnetic field and dimensions of the pole assemblies are chosen.

$B_0 = 1.0$ Tesla, w=1.0 meters and $\lambda = 0.5$ meters. The length of each pole assembly in the direction of motion of the train is assumed to be 1.0 meter. Several pole assemblies will be used to levitate the train cars.

The circuits in the track are assumed to be spaced apart 0.01 meters between conductor centers, and to be made up of aluminum or copper conductors with a resistance, as calculated from equation [6], of $6\times10^{-4}$ ohms/circuit. Using ferromagnetic material on the lower leg of each circuit, the inductance per circuit is adjusted to be $1.2\times10^{-4}$ henrys.

It is further assumed that the levitating system has a "factor of safety" of 2. That is, the levitation occurs at a mean distance y, above the track surface that corresponds to one-half of the maximum levitating force (i.e., y=0).

With the above parameters, from equation [2], the force per circuit is found to be 333 Newtons/circuit. To provide a levitating force of $5\times10^5$ Newtons therefore requires the energizing of 1500 circuits at a time. This implies a total length of pole-face "exciter" arrays (on the car) of 15 meters, i.e., 75 meters on each side for the two parallel arrays.

For the given parameters, equation [7] produces the ratio Force/Power loss=1.25 Newtons/Watt. The calculated total power required to levitate the train car is therefore equal to $5\times10^5$ Newtons/1.25Newtons/Watt=400 kW, or about 5% of the aerodynamic drag power.

The above results do not represent optimum values, but are given simply to illustrate the principles of the invention.

Changes and modifications in the specifically described embodiments can be carried out without departing from the scope of the invention, which is intended to be limited by the scope of the appended claims.

I claim:

1. A magnetic levitation system, comprising:

a plurality of pole assemblies attached to a movable object;

a track;

a plurality of closed inductively loaded circuits connected to said track; and means for automatic centering of said movable object on said track;

wherein said plurality of pole assemblies are magnetically connected to said plurality of closed inductively loaded circuits, wherein said plurality of closed inductively loaded circuits comprise a linear array of closed inductively loaded circuits, wherein a force exerted between a single pole assembly of said plurality of pole assemblies and a single circuit of said linear array of closed inductively loaded circuits is:

$$F = \frac{\lambda}{4\pi} \left[ \frac{(B_0 w)^2}{L_0} \right] \exp(-2ky) \text{ Newtons,}$$

where $\lambda$ is the length of one period of said array, $B_0$ is the magnetic field of one circuit of said circuits, w is the width of said circuit, $L_0$ is the inductance (in henrys) of said circuit, $k=2\pi/\lambda$ and y is a displacement in the direction perpendicular to the face of said array.

2. The system of claim 1 further comprising means for introducing a pulse of current into said closed inductively loaded circuits.

3. The system of claim 2, wherein said means for introducing a pulse of current into said closed inductively loaded circuits comprise turns of wire on at least one closed inductively loaded circuit of said plurality of closed inductively loaded circuits.

4. The system of claim 1, wherein said movable object is a train.

5. The system of claim 1, further comprising means for providing a sequential pulse to said plurality of closed inductively loaded circuits.

* * * * *